United States Patent
Park

(10) Patent No.: US 9,237,432 B2
(45) Date of Patent: Jan. 12, 2016

(54) SYSTEM AND METHOD FOR EMERGENCY SERVICE USING TELEMATICS

(71) Applicant: Hyundai Motor Company, Seoul (KR)

(72) Inventor: Jong Rae Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/452,114

(22) Filed: Aug. 5, 2014

(65) Prior Publication Data

US 2015/0281932 A1  Oct. 1, 2015

(30) Foreign Application Priority Data

Mar. 26, 2014 (KR) ........................ 10-2014-0035504

(51) Int. Cl.
*H04W 4/22* (2009.01)

(52) U.S. Cl.
CPC ....................................... *H04W 4/22* (2013.01)

(58) Field of Classification Search
CPC ............ H04M 11/04; H04M 2242/04; H04M 3/5116; H04M 11/00; H04W 4/22; H04W 76/00; G08B 25/016; H04H 20/59
See application file for complete search history.

(56) References Cited

U.S. PATENT DOCUMENTS

2013/0149985 A1   6/2013  Yi et al.
2013/0324174 A1*  12/2013 Mueck .......................... 455/509

FOREIGN PATENT DOCUMENTS

| KR | 10-2005-0045067 A | 5/2005 |
|----|-------------------|--------|
| KR | 20070049700 A     | 5/2007 |
| KR | 20080012612 A     | 2/2008 |
| KR | 20090051653 A     | 5/2009 |

OTHER PUBLICATIONS

Lee, Hansun, News Article from AJU Business Daily, "The Opening Event for TV While Space Trial Services", English Abstract, Dec. 20, 2013.

* cited by examiner

*Primary Examiner* — Curtis Odom
(74) *Attorney, Agent, or Firm* — Mintz Levin Cohn Ferris Glovsky and Popeo, P.C.; Peter F. Corless

(57) ABSTRACT

A method for emergency service using telematics includes: attempting to transmit an emergency service request message to a telematics center through mobile communication when a telematics terminal receives an emergency signal; confirming, by the telematics terminal, whether the telematics terminal processes the emergency service in attempting to transmit the emergency service request message; informing a vehicle terminal of the fact that the emergency service is not processed if it is confirmed that the telematics terminal does not process the emergency service; and receiving, by the vehicle terminal, the emergency service request message from the telematics terminal to process the emergency service through TV white space (TVWS) communication, thereby extending an emergency service coverage using the telematics. A system for emergency service using telematics involves communication between the telematics terminal, the telematics center, and the vehicle terminal, in order to process the emergency service request message through TVWS communication.

13 Claims, 4 Drawing Sheets

SYSTEM AND METHOD FOR EMERGENCY SERVICE USING TELEMATICS

CROSS-REFERENCE TO RELATED APPLICATION

This application claims under 35 U.S.C. §119(a) the benefit of Korean Patent Application No. 10-2014-0035504, filed on Mar. 26, 2014 in the Korean Intellectual Property Office, the disclosure of which is incorporated herein in its entirety by reference.

BACKGROUND (a) Field of the Invention

The present invention relates a system and method for emergency service using telematics which enables emergency service to be requested anywhere at the time of occurrence of an emergency situation by extending emergency service coverage of the telematics using a TV white space (TVWS).

(b) Description of the Related Art

Telematics is a vehicle wireless Internet service in which a vehicle is combined with wireless communication, and which may allow a driver to remotely diagnose a vehicle through a wireless network, to use various types of information such as traffic and life information and emergency recovery using a terminal in which a wireless modem is equipped, and to transmit a telephone message, exchange e-mail, and download an audio book within the vehicle.

A telematics terminal which supports the telematics services recognizes situations when a driver manually inputs an SOS switch or an air bag is deployed due to a vehicle collision and attempts to connect a telephone to a telematics center. When the telephone connects to the telematics center, the driver informs an operator of the telematics center of a current position, an accident occurrence situation and the like, and therefore may rapidly process emergency situations such as a vehicle accident.

Since the telematics terminal according to the related art uses mobile communication to provide communications with the telematics center, when the telematics terminal is out of a service area of a mobile communication base station, the telematics terminal may not use emergency services.

Further, the related art may use a satellite service, a radio service or the like to replace a mobile communication service area; however, there is a need for paid subscription to use these services.

SUMMARY

The present invention provides a system and a method for emergency service using telematics which enables emergency service to be requested anywhere at the time of occurrence of an emergency situation by extending an emergency service coverage of the telematics using a TV white space (TVWS).

According to an exemplary embodiment of the present invention, a method for emergency service using telematics includes: attempting to transmit an emergency service request message to a telematics center through mobile communication when a telematics terminal receives an emergency signal; confirming, by the telematics terminal, whether the telematics terminal processes the emergency service in the step of attempting to transmit the emergency service request message; informing a vehicle terminal that the emergency service is not processed if it is confirmed that the telematics terminal does not process the emergency service; and receiving, by the vehicle terminal, the emergency service request message from the telematics terminal to process the emergency service through TV white space (TVWS) communication.

The emergency service request message may include a vehicle number, a telephone number, and position information.

In the confirming whether the telematics terminal processes the emergency service, it may be confirmed that a receive sensitivity of a mobile communication signal is equal to or less than a threshold value.

In the step of confirming whether the telematics terminal processes the emergency service, the telematics terminal may transmit the emergency service request message to the telematics center but confirm whether the telematics terminal receives a telephone connection request message from the telematics center.

In the step of confirming whether the telematics terminal processes the emergency service, the telematics terminal may transmit the emergency service request message, receive a telephone connection request message from the telematics center, and then confirm whether a telephone connection to the telematics center fails.

According to another exemplary embodiment of the present invention, a system for emergency service using telematics includes: a telematics terminal configured to attempt to transmit an emergency service request message through mobile communication when receiving an emergency signal, confirm whether the telematics terminal processes an emergency service, and inform the confirmed result; a telematics center configured to provide the emergency service based on the emergency service request message when receiving the emergency service request message; a vehicle terminal configured to transmit the emergency service request message through TV white space (TVWS) communication when being informed that the telematics terminal does not process the emergency service from the telematics terminal; and a TVWS server configured to transmit the emergency service request message transmitted from the vehicle terminal to the telematics terminal and manage usable TVWS communication frequency information based on position information.

The emergency signal may be an air bag deployment signal or a passive rescue signal.

The telematics terminal may determine that the emergency service is not processed when receive sensitivity of a mobile communication signal is equal to or less than a threshold value.

The telematics terminal may determine that the emergency service is not processed when transmitting the emergency service request message and then not receiving a telephone connection request message from the telematics center.

The telematics terminal may determine that the telematics terminal does not process the emergency service when the telematics terminal fails to attempt to connect a telephone to the telematics center by transmitting the emergency service request message and receiving a telephone connection request message from the telematics center.

The vehicle terminal may include: a GPS module configured to obtain current position information of a vehicle; a TVWS module configured to manage usable TVWS communication frequency information based on the current position information and transmit the emergency service request message using the TVWS communication frequency; and a second controller configured to confirm a state between the vehicle terminal and the telematics terminal and process the emergency service using the TVWS module depending on the confirmed result.

The second controller may directly communicate with the TVWS server through the TVWS module to update the TVWS communication frequency information based on the current position of the vehicle.

A non-transitory computer readable medium containing program instructions executed by a processor on a controller, includes: program instructions that attempt to transmit an emergency service request message to a telematics center through mobile communication when a telematics terminal receives an emergency signal; program instructions that confirm, by the telematics terminal, whether the telematics terminal processes the emergency service when attempting to transmit the emergency service request message; program instructions that inform a vehicle terminal that the emergency service is not processed if it is confirmed that the telematics terminal does not process the emergency service; and program instructions that receive, by the vehicle terminal, the emergency service request message from the telematics terminal to process the emergency service through TV white space (TVWS) communication.

BRIEF DESCRIPTION OF THE DRAWINGS

The above and other objects, features and advantages of the present invention will be more apparent from the following detailed description taken in conjunction with the accompanying drawings.

DETAILED DESCRIPTION OF THE EMBODIMENTS

Hereinafter, exemplary embodiments of the present invention will be described with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention is configured to extend telematics emergency service coverage using a TV white space (hereinafter, referred to as "TVWS"). As used herein, the term "TVWS" means locally unused TV channels not used by broadcasters in VHF and UHF frequency bands distributed for TV broadcasting. In particular, the TVWS may be a white space to prevent frequency interference between broadcasters, the locally unused TV channels band, an allocable frequency in a time zone in which broadcasters do not send out TV signals, and the like.

Figure 1:
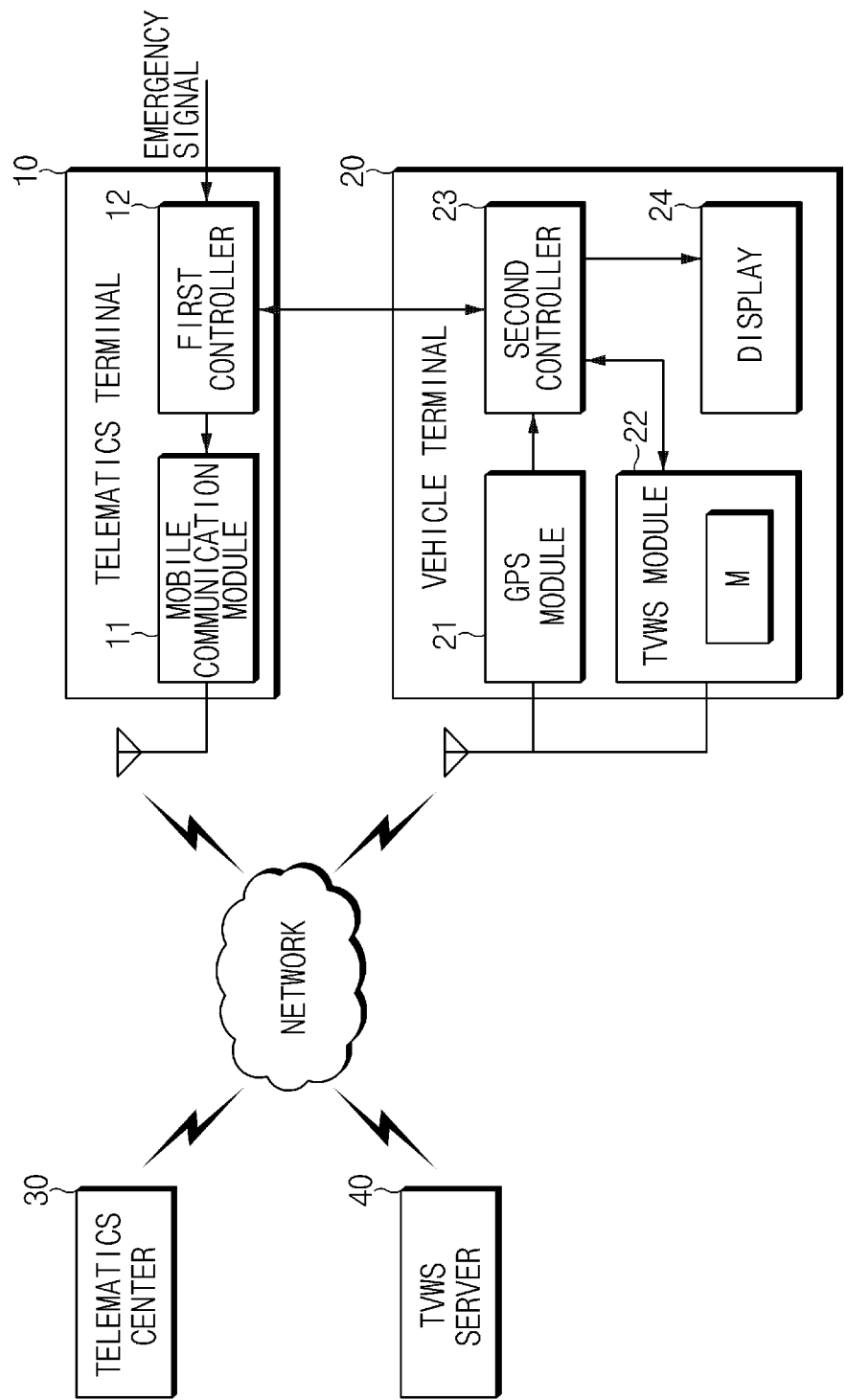
FIG. 1 is a block configuration diagram illustrating a system for emergency service using telematics according to an exemplary embodiment of the present invention.

FIG. 1 is a block configuration diagram illustrating a system for emergency service using telematics according to an exemplary embodiment of the present invention.

Referring to FIG. 1, a system for emergency service according to an exemplary embodiment of the present invention may include a telematics terminal 10, a vehicle terminal 20, a telematics center 30, and a TVWS server 40.

The telematics terminal 10 diagnoses a vehicle state, directly requests emergency service to the telematics center 30 at the time of occurrence of an emergency situation, or requests emergency service to the telematics center 30 through the vehicle terminal 20.

The telematics terminal 10 confirms whether an emergency service may not be processed, and if it is determined that the emergency service may not be processed, the telematics terminal 10 requests the emergency service processing to the vehicle terminal 20. When receive sensitivity (receiving antenna level) of a mobile communication signal is "0" or the telematics terminal 10 requests the emergency service to the telematics center 30 but does not receive acknowledgement, the telematics terminal 10 determines that the emergency service may not be processed.

The telematics terminal 10 may include a mobile communication module 11 and a first controller 12.

The mobile communication module 11 performs wireless communication with the telematics center 30 through mobile communication.

The first controller 12 checks the receive sensitivity of the antenna through the mobile communication module 11. Further, when sensing the occurrence of an emergency situation, the first controller 12 generates and transmits an emergency service request message in response to the sensed result. In particular, when receiving emergency signals such as an air bag deployment signal or a passive rescue signal, the first controller 12 senses that an emergency situation has occurred. Further, the emergency service request message is generated in a packet type and includes a vehicle number, a telephone number, position information, and the like.

When the telematics terminal 10 may not process the emergency service, the first controller 12 informs the vehicle terminal 20 of the state in which the telematics terminal 10 may not process the emergency service and transmits the emergency service request message.

Meanwhile, the first controller 12 directly transmits the emergency service request message to the telematics center 30 through the mobile communication module 11 when the telematics terminal 10 may process the emergency service.

The vehicle terminal 20 may be implemented as an audio and video navigation terminal which provides a navigation function, a multimedia playing function, and the like. The vehicle terminal 20 is connected to the telematics terminal 10 through a controller area network (CAN) interface or a universal asynchronous receiver/transmitter (UART) interface, and thus a state between the vehicle terminal 20 and the telematics terminal 10 is confirmed, and data are transmitted between the vehicle terminal 20 and the telematics terminal 10.

The vehicle terminal 20 may include a global positioning system (GPS) module 21, a TVWS module 22, a second controller 23, and a display 24.

The GPS module 21 continuously detects a current position of a vehicle using a satellite.

The TVWS module 22 performs wireless communication using TVWS. The TVWS module 22 includes a memory M in which communication possible frequency information at a current position among the TVWSs is stored. The TVWS module 22 communicates with a TVWS server 40 to update the communication possible frequency information which is stored in the memory M.

A second controller 23 confirms a current position of a vehicle through the GPS module 21 at a predetermined period and transmits the confirmed position information of the vehicle to the telematics terminal 10.

In the case in which there is no TVWS communication possible frequency information in the memory M of the TVWS module 22 when the vehicle terminal is initially activated, the second controller 23 is connected to the TVWS server 40 through the telematics terminal 10 and the telematics center 30 to receive the TVWS communication possible frequency information which may be used at the current position and store the received TVWS communication possible frequency information in the memory M of the TVWS module 22.

Next, the second controller 23 directly communicates with the TVWS server 40 through the TVWS module 22 and receives the TVWS communication possible frequency information from the TVWS server 40 to update the TVWS communication possible frequency information which is prestored in the memory M of the TVWS module 22.

The display 24 displays an operation state and result on the vehicle terminal 20. The display 24 also outputs an emergency service progress and result by the telematics terminal 10 and the vehicle terminal 20.

The telematics center 30 processes the vehicle information transmitted from the telematics terminal 10 to provide various telematics services. When receiving the emergency service request message transmitted from the telematics terminal 10, the telematics center 30 transmits a telephone connection request message to the telematics terminal 10. The telematics terminal 10 attempts to connect a telephone to a counselor of the telematics center 30 through a telephone number included in the telephone connection request message.

The TVWS server 40 manages the usable TVWS communication possible frequency information based on the position information. The TVWS server 40 is connected to the telematics center 30 in a wired or wireless manner to provide the TVWS communication possible frequency information which may be used at the current position of the vehicle depending on the request of the telematics center 30.

The TVWS server 40 determines whether the TVWS communication possible frequency information needs to be updated based on the TVWS communication possible frequency information and the current position information of the vehicle which are transmitted from the vehicle terminal 20. The TVWS server 40 informs the vehicle terminal 20 of the fact that the communication possible frequency information needs to be updated and transmits the TVWS communication possible frequency update information.

Figure 2:
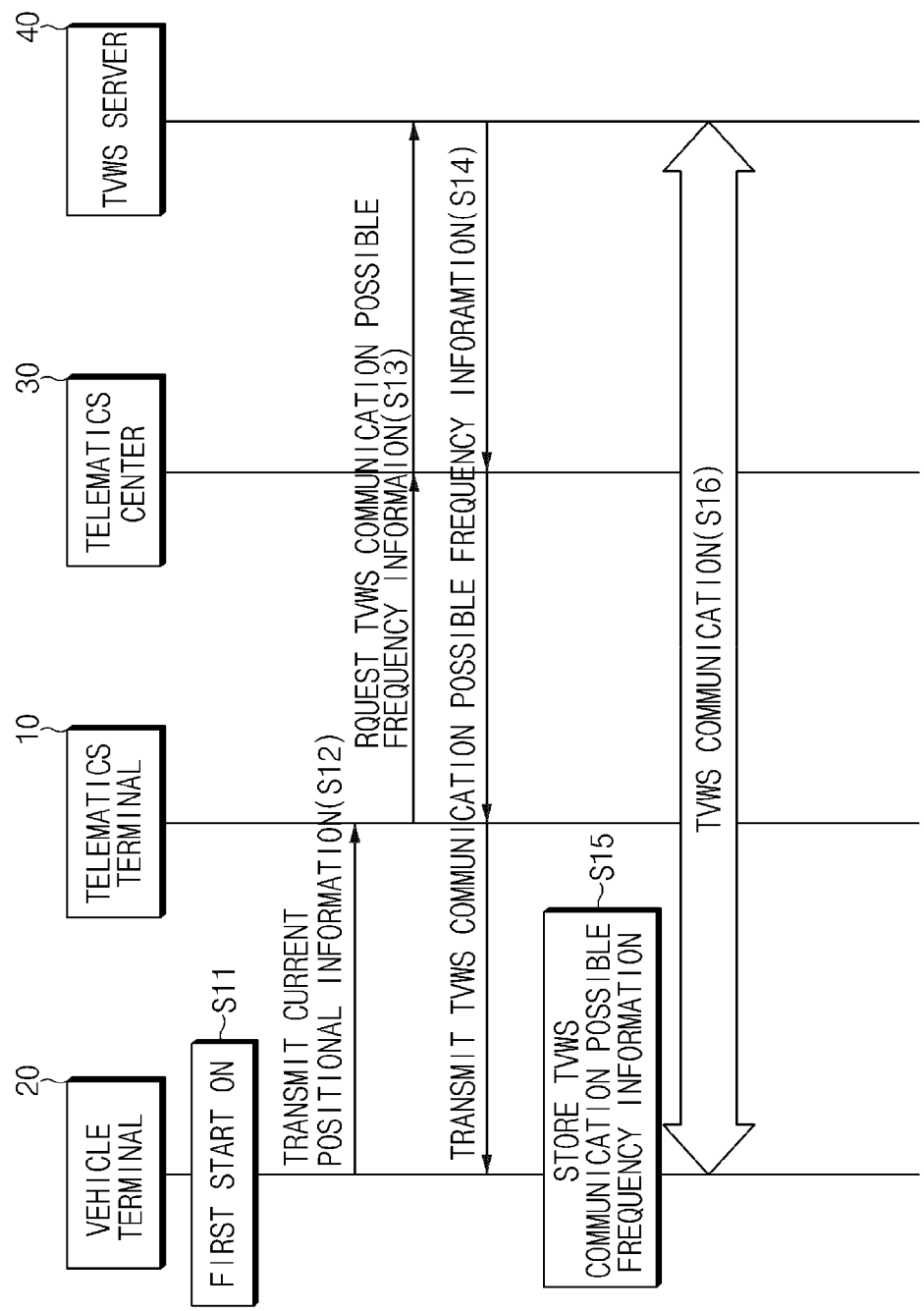
FIG. 2 is a diagram illustrating a process of initializing TVWS communication possible frequency information according to an exemplary embodiment of the present invention.

FIG. 2 illustrates a process of initializing TVWS communication possible frequency information according to an exemplary embodiment of the present invention.

When the vehicle terminal 20 first starts on (i.e., is initially turned on or activated), the vehicle terminal 20 confirms whether the TVWS communication possible frequency information is present in the memory M of a TVWS module 22 (S11).

When the TVWS communication possible frequency information is not present in the memory M, the vehicle terminal 20 transmits the current position information of the vehicle obtained through the GPS module 21 to the telematics terminal 10 (S12).

The telematics terminal 10 requests the TVWS communication possible frequency information, which may be used at the current position of the vehicle, to the TVWS server 40 via the telematics center 30 through the mobile communication module 11 (S13).

The TVWS server 40 transmits the TVWS communication possible frequency information based on the current position information of the vehicle to the vehicle terminal 20 via the telematics center 30 and the telematics terminal 10, depending on the TVWS communication possible frequency information request (S14).

The vehicle terminal 20 stores the TVWS communication possible frequency information transmitted from the telematics terminal 10 in the memory M (S15).

After initialization, the TVWS module 22 directly wirelessly communicates with the TVWS server 40 through the TVWS communication possible frequency (S16). For example, the TVWS communication possible frequency information includes frequency information which may be used within about 10 km of maximum radius based on the current position of the vehicle.

Figure 3:
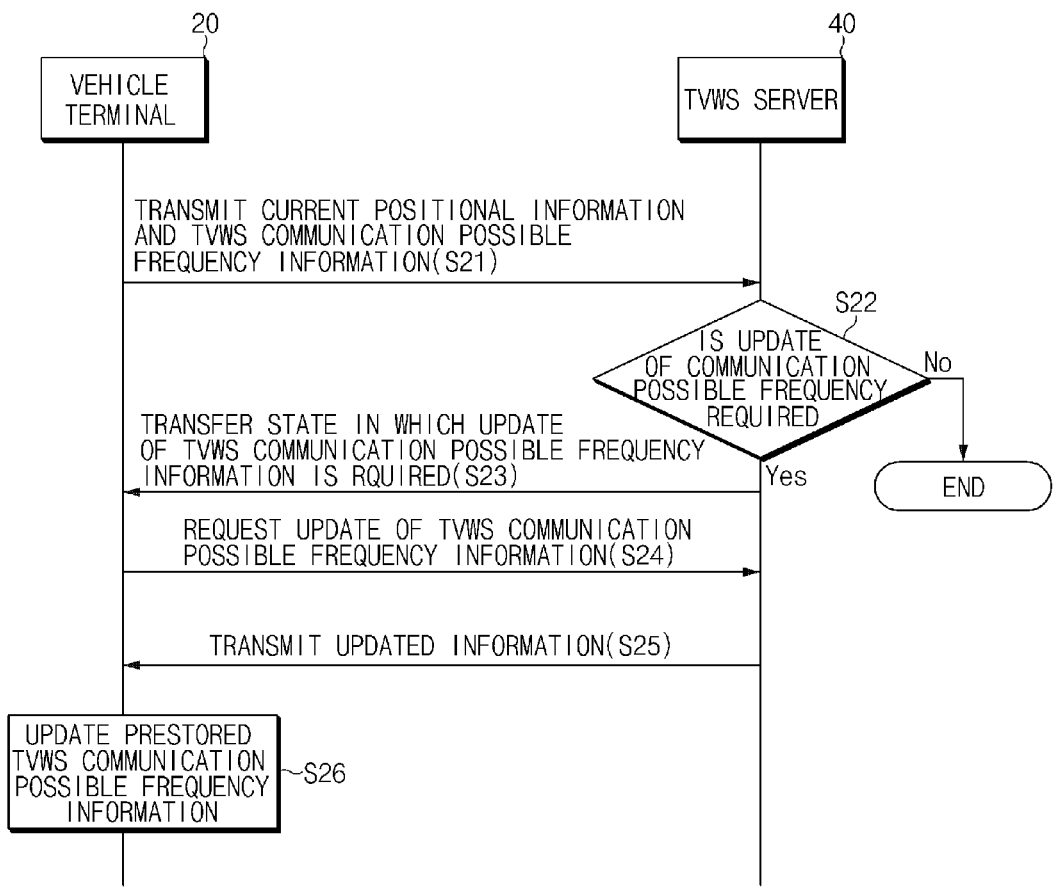
FIG. 3 is a diagram illustrating a process of updating TVWS communication possible frequency information according to an exemplary embodiment of the present invention.

FIG. 3 is a diagram illustrating a process of updating TVWS communication possible frequency information according to an exemplary embodiment of the present invention.

Referring to FIG. 3, the vehicle terminal 20 transmits the current position information and the TVWS communication possible frequency information which is prestored in the memory M of the TVWS module 22 to the TVWS server 40 (S21). In this case, the vehicle terminal 20 requests to the TVWS server 40 whether the TVWS communication possible frequency information needs to be updated.

The TVWS server 40 compares position based frequency information stored in a frequency management database with the TVWS communication possible frequency information transmitted from the vehicle terminal 20 to determine whether the TVWS communication frequency information which may be used at the current position of the vehicle needs to be updated (S22).

When the TVWS communication possible frequency information needs to be updated, the TVWS server 40 transmits the message informing that the frequency information needs to be updated to the vehicle terminal 20 (S23).

When the update of the frequency information is required, the vehicle terminal 20 requests the update of the TVWS communication possible frequency information to the TVWS server 40 (S24).

The TVWS server 40 transmits the TVWS communication possible frequency update information to the vehicle terminal 20 depending on the request of the vehicle terminal 20 (S25).

The vehicle terminal 20 receives the TVWS communication possible frequency update information through the TVWS module 22 and stores the received TVWS communication possible frequency update information in the memory M (S26).

Meanwhile, the TVWS server 40 informs the vehicle terminal 20 of the fact that the update of the TVWS communication possible frequency information is not required.

Figure 4:
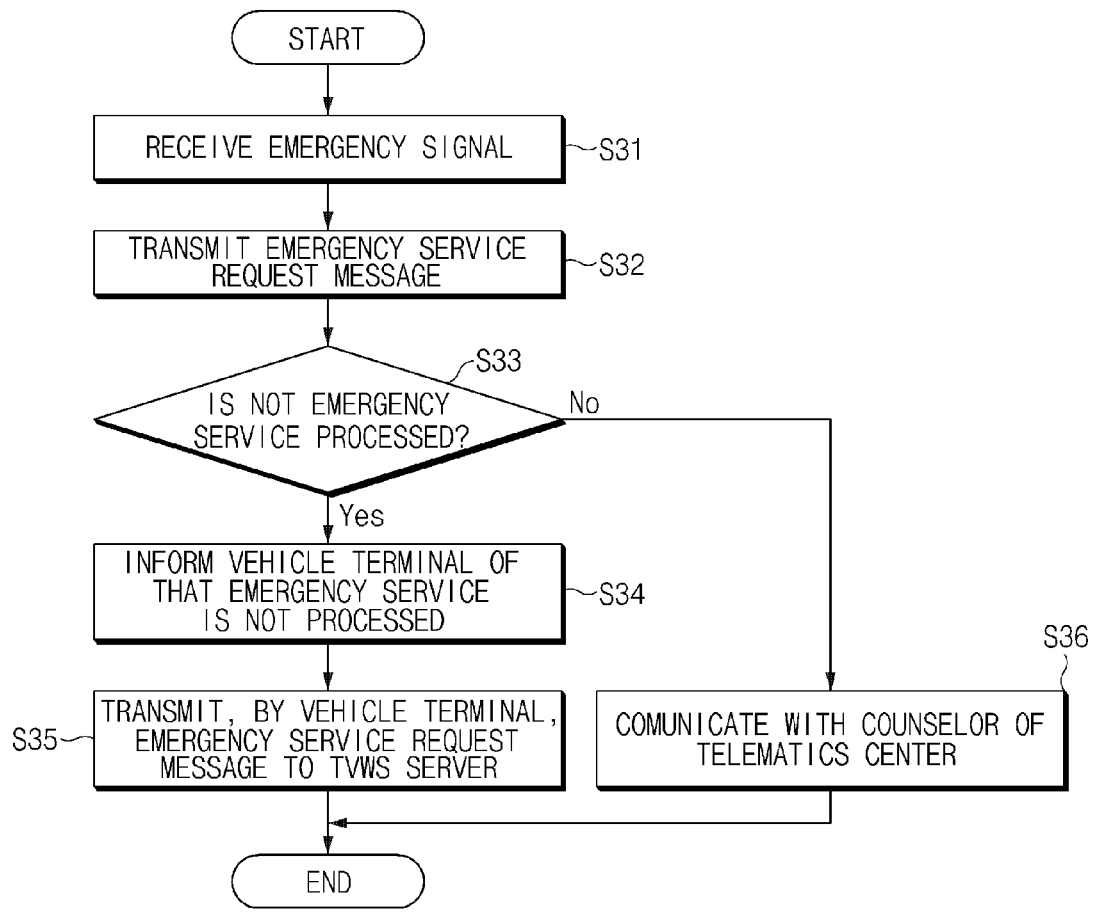
FIG. 4 is a flow diagram illustrating a method for emergency service using telematics according to another exemplary embodiment of the present invention.

FIG. 4 illustrates a method for emergency service using telematics according to another exemplary embodiment of the present invention.

The telematics terminal 10 receives an emergency signal (S31). In particular, the emergency signal may be an air bag deployment signal or a passive rescue signal.

When receiving the emergency signal, the telematics terminal 10 generates the emergency service request message and transmits the generated emergency service request message to the mobile communication module 11 (S32).

The telematics terminal 10 attempts to transmit the emergency service request message to confirm whether the telematics terminal 10 may not process the emergency service (S33). In particular, in cases in which the receive sensitivity of the mobile communication signal received through the mobile communication module 11 is equal to or less than a threshold value or the telematics terminal 10 transmits the emergency service request message and then does not receive the telephone connection request message from the telematics center 30 or receives the telephone connection message to attempt to connect the telephone to the telematics center but to fail in the telephone connection, the telematics terminal 10 recognizes such cases as the state in which the emergency service may not be processed.

When the telematics terminal 10 may not process the emergency service, the telematics terminal 10 informs the vehicle terminal 20 of that the emergency service may not be processed (S34).

The vehicle terminal 20 transmits the emergency service request message transmitted from the telematics terminal 10 to the TVWS server 40 (S35). The vehicle terminal 20 transmits the emergency service request message using any one of a variety of TVWS communication possible frequency information stored in the memory M.

Meanwhile, when the telematics terminal 10 may process the emergency service, the telematics terminal 10 connects a telephone to the telematics center 30 to provide the emergency service.

In particular, when the telematics center 30 receives the emergency service request message, the telematics center 30 transmits the telephone connection request message to the telematics terminal 10. The telematics terminal 10 attempts to connect a telephone to a counselor of the telematics center 30 based on the telephone connection request message.

According to the exemplary embodiments of the present invention, it is possible to rapidly request emergency service anywhere at the time of the occurrence of an emergency situation by extending the emergency service coverage of the telematics using the TV white space (TVWS).

The present invention described above may be variously substituted, altered, and modified by those skilled in the art to which the present invention pertains without departing from the scope and spirit of the present invention. Therefore, the present invention is not limited to the above-mentioned exemplary embodiments and the accompanying drawings.

What is claimed is:

1. A method for emergency service using telematics, the method comprising:
   attempting to transmit an emergency service request message to a telematics center through mobile communication when a telematics terminal receives an emergency signal;
   confirming, by the telematics terminal, whether the telematics terminal processes the emergency service in the step of attempting to transmit the emergency service request message;
   informing a vehicle terminal that the emergency service is not processed if it is confirmed that the telematics terminal does not process the emergency service; and
   receiving, by the vehicle terminal, the emergency service request message from the telematics terminal to process the emergency service through TV white space (TVWS) communication.

2. The method according to claim 1, wherein the emergency service request message includes a vehicle number, a telephone number, and position information.

3. The method according to claim 1, wherein in the step of confirming whether the telematics terminal processes the emergency service, it is confirmed that a receive sensitivity of a mobile communication signal is equal to or less than a threshold value.

4. The method according to claim 1, wherein in the step of confirming whether the telematics terminal processes the emergency service, the telematics terminal transmits the emergency service request message to the telematics center but confirms whether the telematics terminal receives a telephone connection request message from the telematics center.

5. The method according to claim 1, wherein in the step of confirming whether the telematics terminal processes the emergency service, the telematics terminal transmits the emergency service request message, receives a telephone connection request message from the telematics center, and then confirms whether a telephone connection to the telematics center fails.

6. A system for emergency service using telematics, the system comprising:
   a telematics terminal configured to attempt to transmit an emergency service request message through mobile communication when receiving an emergency signal, confirm whether the telematics terminal processes an emergency service, and inform the confirmed result;
   a telematics center configured to provide the emergency service based on the emergency service request message when receiving the emergency service request message;
   a vehicle terminal configured to transmit the emergency service request message through TV white space (TVWS) communication when being informed that the telematics terminal does not process the emergency service from the telematics terminal; and a TVWS server configured to transmit the emergency service request message transmitted from the vehicle terminal to the telematics terminal and manage usable TVWS communication frequency information based on position information.

7. The system according to claim 6, wherein the emergency signal is an air bag deployment signal or a passive rescue signal.

8. The system according to claim 6, wherein the telematics terminal determines that the emergency service is not processed when receive sensitivity of a mobile communication signal is equal to or less than a threshold value.

9. The system according to claim 6, wherein the telematics terminal determines that the emergency service is not processed when transmitting the emergency service request message and then not receiving a telephone connection request message from the telematics center.

10. The system according to claim 6, wherein the telematics terminal determines that the telematics terminal does not process the emergency service when the telematics terminal fails to attempt to connect a telephone to the telematics center by transmitting the emergency service request message and receiving a telephone connection request message from the telematics center.

11. The system according to claim 6, wherein the vehicle terminal includes:
   a GPS module configured to obtain current position information of a vehicle;
   a TVWS module configured to manage usable TVWS communication frequency information based on the current position information and transmit the emergency service request message using the TVWS communication frequency; and
   a controller configured to confirm a state between the vehicle terminal and the telematics terminal and process the emergency service using the TVWS module depending on the confirmed result.

12. The system according to claim 11, wherein the controller directly communicates with the TVWS server through the TVWS module to update the TVWS communication frequency information based on the current position of the vehicle.

13. A non-transitory computer readable medium containing program instructions executed by a processor on a controller, the computer readable medium comprising:
   program instructions that attempt to transmit an emergency service request message to a telematics center through mobile communication when a telematics terminal receives an emergency signal;
   program instructions that confirm, by the telematics terminal, whether the telematics terminal processes the emergency service when attempting to transmit the emergency service request message;
   program instructions that inform a vehicle terminal that the emergency service is not processed if it is confirmed that the telematics terminal does not process the emergency service; and
   program instructions that receive, by the vehicle terminal, the emergency service request message from the telematics terminal to process the emergency service through TV white space (TVWS) communication.

* * * * *